UNITED STATES PATENT OFFICE.

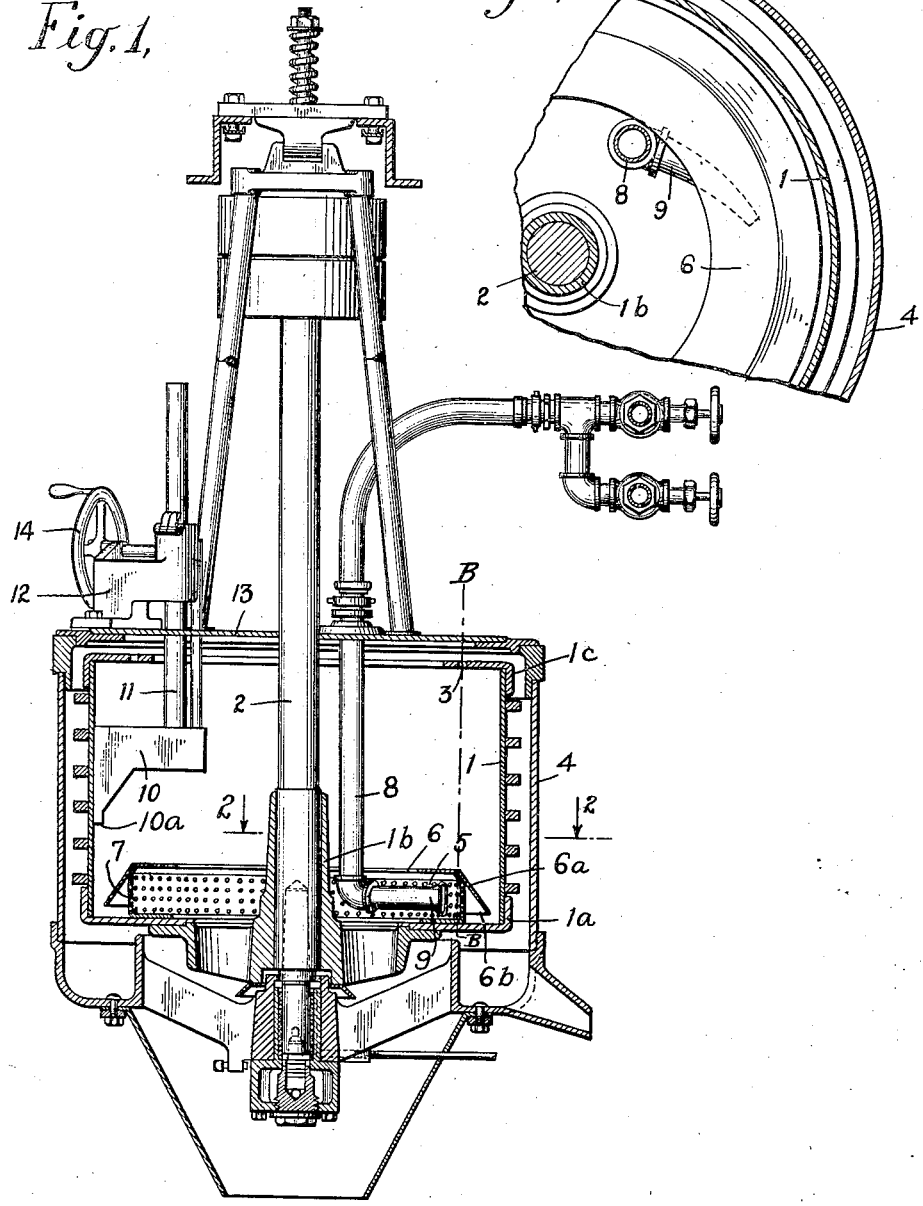

ERNST KÖPKE, OF HONOLULU, TERRITORY OF HAWAII.

CENTRIFUGAL SEPARATOR.

1,117,195.  Specification of Letters Patent.  Patented Nov. 17, 1914.

Application filed January 17, 1914. Serial No. 812,659.

*To all whom it may concern:*

Be it known that I, ERNST KÖPKE, a citizen of the United States, residing at Honolulu, in the county of Honolulu and Territory of Hawaii, have invented certain new and useful Improvements in Centrifugal Separators; and I do hereby declare the following to be a full, clear, and exact description of the invention, such as will enable others skilled in the art to which it appertains to make and use the same.

This invention relates to centrifugal clarifiers or separators, and is particularly adapted for the separation of mechanical impurities from juices in the manufacture of sugar.

The principal mechanical impurities in cane juices, after being limed and heated, are: earth, small particles of fiber, coagulated albumin and lime.

The method universally employed in sugar factories for separating the clear juice from the muds, is by the use of settling tanks and filter presses. In the settling tanks, the earth and lime are rapidly precipitated, while the particles of fiber and albumin either rise to the surface or float about indifferently in the juice. The operation requires the lapse of considerable time before separation can be sufficiently effected so that from 70% to 80% can be drawn off in a fairly clear condition, and the remaining 20% to 30%, which carries all the mechanical impurities, can be drawn off as scum or mud, and then be treated in the filter presses. The disadvantages of this method of separation are: the loss of heat, the loss of sugar by inversion which occurs in the presses, the space occupied by the tanks and the presses, and the large quantity of juice always under treatment owing to the length of time required by this process.

My invention contemplates a centrifugal clarifier or separator which will separate the mechanical impurities from the juice, thus eliminating settling tanks and mud presses with all their disadvantages. It requires only about one-half of the heat, less labor to operate, and less water for exhausting the mud, than with the process above mentioned. By its use, very little juice is in storage at any time, practically no inversion occurs, and no filter cloth is required. The space required in the factory is materially reduced.

The essential features of my present invention are: a cylindrical revoluble bowl with imperforate sides, which admits of being scraped by a mechanical mud discharger without injury to its sides; an introduction chamber formed concentrically within the bowl comprising, a plate ring having its top flat and horizontal and its outer portion conical and declining toward the bottom head of the bowl and toward the imperforate sides of the bowl, the lower edge of the conical portion being concentric with and near the walls of the bowl and adjacent to the bottom head of the bowl, this plate ring being supported by a vertical cylindrical perforated plate having its lower end secured to the bottom head of the bowl; and an introduction pipe with suitable nozzle by which the liquor to be treated enters the introduction chamber in a ribbon like stream and in a direction as nearly tangential as possible to the liquor inside of the aforesaid perforated supporting plate; all of which will hereinafter more fully appear.

In the accompanying drawings, forming a part of this specification, Figure 1 represents in sectional elevation a centrifugal clarifier or separator embodying my invention. Fig. 2 is a sectional plan view of a portion of the bowl of the same machine on the line 2—2 of Fig. 1, showing the inlet nozzle.

Referring to the drawings, the revoluble bowl 1 may be mounted in any suitable manner, for example, with its spindle 2 either suspended from the top, as in the Weston type, or with a top and a bottom bearing, as in the Hepworth type of centrifugal machines. The revoluble bowl 1, which has imperforate sides or walls, is provided with a lower head 1ª secured to the hub 1ᵇ attached to the spindle 2, and with a flat ring shaped upper head 1ᶜ. This upper head 1ᶜ is provided with slots or holes 3, through which the clarified liquor is discharged from the bowl into the tub or curb 4.

An introduction chamber 5 is formed concentrically within the bowl 1, by means of a plate ring 6 supported by a vertical cylindrical perforated plate 7. The upper portion of the plate ring 6 is flat and approximately horizontal, and the lower or outer portion 6ª is conical and declines from the upper portion downward and outward, as shown. The lower edge 6ᵇ of the conical portion 6ᵃ is made true and concentric with the bowl 1, and is near the imperforate walls of the bowl and adjacent to the lower head 1ᵃ. The lower edge of the cylindrical perforated supporting plate 7 is secured to the lower head 1ᵃ. This plate 7 is vertical and concentric with the bowl 1, and is located slightly outside of vertical lines passing through the discharge outlet holes 3, as represented by the line B—B in Fig. 1.

The liquor to be treated is introduced through the pipe 8 provided with the nozzle 9 through which the liquor enters the introduction chamber 5 in a ribbon like stream and in a direction as nearly tangential as possible to the liquor inside of the perforated supporting plate 7. The position of this ribbon like discharge from the nozzle 9 within the introduction chamber 5, toward or away from the perforated supporting plate 7, may be altered by turning the pipe 8. The nozzle 9, however, must always clear the inner surface of the liquor of maximum horizontal depth within the introduction chamber 5.

The mud discharging blade 10 is secured to the lower end of the bar 11, adapted to be moved vertically in the bracket casting 12 supported by the plate cover 13 of the tub or curb 4. The bar 11 may be raised or lowered by turning the hand wheel 14, by means of the well known rack and pinion movement. This blade 10 is shaped such that it will just clear the plate ring 6 when it is lowered and its lower end 10ᵃ is in contact with the lower head 1ᵃ of the bowl 1. The bar 11 clears the inner edge of the upper head 1ᶜ of the bowl 1.

In operation, the liquor with its admixed impurities is discharged under pressure through the nozzle 9 in a ribbon like stream and at a relatively slow speed onto the surface of the revolving liquor inside of the introduction chamber 5. The liquor in this chamber is accelerated partially by contact with the plate ring 6 and the lower head 1ᵃ but mostly by contact with the perforated supporting plate 7. The depth horizontally of this liquor within the introduction chamber 5 varies and depends upon the resistance offered to the flow of the liquor through the contracted annular opening between the edge 6ᵇ and the deposited muds, as will hereinafter appear. When the liquor in the introduction chamber 5 has attained the same speed as that of the perforated plate 7, it is forced through the perforations in said plate in radial individual streams into the contracting chamber under the conical portion 6ᵃ of the plate 6. The perforated plate 7 is not a strainer, for the screen of the juice strainer at the mill, through which the juice has been strained, has finer perforations than those of this plate 7. The function of the perforated plate 7, in addition to that of supporting the plate 6, is to accelerate the liquor within the introduction chamber 5 and to cause the liquor to flow through its perforations in individual radial streams into the contracting chamber, as previously mentioned. These radial streams are again united in this contracting chamber and are accelerated by contact with the conical portion 6ᵃ of the plate 6, and pass under the lip or edge 6ᵇ, whereupon the heavier impurities in the liquor are thrown by centrifugal force toward the walls of the bowl 1 and are deposited and accumulate in the lower corner of the bowl, in a semi-fluid slime like deposit. This deposit soon builds up under the edge 6ᵇ and has a choking or throttling effect on the passage of the liquor past this edge 6ᵇ, and insures through skin friction the acceleration of the liquor from the speed existing within the contracting chamber to that existing at the edge 6ᵇ. The resistance thus offered to the passage of the liquor through the contracted annular opening between the edge 6ᵇ and the deposited mud, and even through the mud, is perfectly balanced by the automatic increase or decrease of the head or horizontal depth of the liquor in the introduction chamber 5, previously referred to. The clarified liquor accumulates in the bowl 1 until the bowl is filled in up to the line B—B of Fig. 1, whereupon the liquor is discharged through the openings 3 and over the upper head 1ᶜ into the tub or curb 4. During the time the liquor is traveling from the edge 6ᵇ to the discharge outlet 3, it is exposed to centrifugal action and the finer particles are separated thereby from the juice and are deposited on the surface of the muds accumulated near the walls of the bowl. This has been demonstrated by examination of the strata of the horizontal sections of the muds deposited in the bowl. The muds and impurities continue to be deposited and to build up from the walls of the bowl inward until it becomes necessary to remove them from the bowl, which is accomplished by lowering the discharger blade 10, after stopping the flow of liquor through the pipe 8. The muds are thus plowed and fall through the opening inside of the plate 6.

It will be noted that the separation of the impurities or non-fluids from the fluids takes place at the lip or edge 6ᵇ, and that the fluids, which are incompressible, are forced to flow toward the center of gyration, and leave behind the non-fluids which are retained due to their inertia and resistance.

By the arrangement as described, small particles of woody fiber thus become water logged and are separated with the heavier impurities, as the pressure to which they are subjected expels any air they may contain, so that they do not float as in the case with settling tanks.

I claim:

1. A centrifugal separator comprising, a revoluble bowl having imperforate sides, a lower head, a flat ring shaped upper head provided with holes for the discharge of liquor from the bowl, an introduction chamber formed concentrically within the bowl by a plate ring supported by a cylindrical perforated plate, said plate having a flat top and a conical outer portion, and means for introducing the liquor to be treated into the introduction chamber, substantially as set forth.

2. A centrifugal separator comprising, a revoluble bowl having imperforate sides, a lower head, a flat ring shaped upper head provided with holes for the discharge of liquor from the bowl, an introduction chamber formed concentrically within the bowl by a plate ring supported by a cylindrical perforated plate, said plate ring having a conical outer portion, means for introducing liquor into the introduction chamber, and a blade adapted to discharge the mud from the bowl, substantially as described.

3. In a centrifugal separator, a revoluble bowl with imperforate sides, a plate ring having a flat top and a conical outer portion declining toward the lower corner of the bowl, and a cylindrical perforated plate supporting said plate ring.

4. In a centrifugal separator, a revoluble bowl with imperforate sides, a plate ring supported above the lower head of the bowl by a perforated plate, and a mud discharging blade adapted to clear the said plate ring when the said blade is in its lowest position, substantially as and for the purpose as described.

In testimony whereof I affix my signature, in presence of two witnesses.

ERNST KÖPKE.

Witnesses:
H. B. GIFFORD,
N. P. ROTH.